US009865175B2

(12) United States Patent
Johnsson et al.

(10) Patent No.: US 9,865,175 B2
(45) Date of Patent: Jan. 9, 2018

(54) METHOD FOR TRAINING A PERSON WHILE OPERATING A VEHICLE

(71) Applicant: GKN Aerospace Sweden AB, Trollhättan (SE)

(72) Inventors: Thomas Johnsson, Trollhättan (SE); Anders Lundbladh, Trollhätan (SE); Dan Ring, Trollhättan (SE); Olof Hannius, Trollhättan (SE)

(73) Assignee: GKN Aerospace Sweden AB, Trollhattan (SE)

( * ) Notice: Subject to any disclaimer, the term of this patent is extended or adjusted under 35 U.S.C. 154(b) by 481 days.

(21) Appl. No.: 14/477,216

(22) Filed: Sep. 4, 2014

(65) Prior Publication Data

US 2014/0377719 A1    Dec. 25, 2014

Related U.S. Application Data

(63) Continuation of application No. 11/913,858, filed as application No. PCT/SE2005/000915 on Jun. 14, 2005, now abandoned.

(51) Int. Cl.
*G09B 9/02* (2006.01)
*G09B 9/44* (2006.01)
(Continued)

(52) U.S. Cl.
CPC ............... *G09B 9/02* (2013.01); *G06G 7/48* (2013.01); *G09B 9/00* (2013.01); *G09B 9/44* (2013.01); *G09B 19/165* (2013.01)

(58) Field of Classification Search
CPC ................................ G09B 19/165; G09B 9/02
(Continued)

(56) References Cited

U.S. PATENT DOCUMENTS 5,489,830 A * 2/1996 Fernandez .................... 318/628
5,873,546 A   2/1999 Evans et al.
(Continued)

FOREIGN PATENT DOCUMENTS

EP       0732677 A1   9/1996
JP    2001100628 A *  4/2001
WO   2004081900 A1   9/2004

OTHER PUBLICATIONS

English translation of Kishima, Japanese Patent Publication 2001-100628, Jan. 2013.*
(Continued)

*Primary Examiner* — Michael Grant
(74) *Attorney, Agent, or Firm* — Bejin Bieneman PLC

(57) ABSTRACT

In a method for training a person while operating a vehicle, the vehicle has a control system for receiving vehicle operating commands from the person for controlling the vehicle. A calculation unit is provided for simulating a state of the vehicle and/or the environment to which the vehicle is subjected, the simulated state being a possible real state of the vehicle and/or the environment which is different from the actual state of the vehicle and/or the environment. The vehicle operating commands and the calculation unit are used for calculating vehicle command signals. The vehicle command signals are used for controlling the vehicle so as to cause the vehicle to respond to the vehicle operating commands in a way that corresponds to the state simulated by the calculation unit instead of the actual state of the vehicle and/or the environment.

33 Claims, 5 Drawing Sheets

(51) Int. Cl.
 G09B 19/16 (2006.01)
 G06G 7/48 (2006.01)
 G09B 9/00 (2006.01)
(58) Field of Classification Search
 USPC .......................................................... 434/29
 See application file for complete search history.

(56) References Cited

U.S. PATENT DOCUMENTS

2002/0133322 A1    9/2002  Williams et al.
2002/0187459 A1*  12/2002  Stockman ....................... 434/29
2008/0206719 A1*   8/2008  Johnsson et al. ............... 434/37

OTHER PUBLICATIONS

Overmeyer, Bob, "Shuttle Training Aircraft," Mar. 1, 1997, retrieved from internet URL http://www.aopa.org/News-and-Video/All-News/1997/March/1/Shuttle-Training-Aircraft on May 20, 2015.*

Berenji, et al, "Pitch Control of the Space Shuttle Training Aircraft", IEEE Transactions on Control Systems Technology, vol. 9, No. 3, May 2001.*

* cited by examiner

Maximum acceleration (left) and increase in velocity (right) of a loaded and unloaded aircraft for a PLA step at 4s.

Acceleration (left) and thrust command (right) for the training aircraft, dashed line for the simulated aircraft response and command.

METHOD FOR TRAINING A PERSON WHILE OPERATING A VEHICLE

The present application is a continuation of U.S. application Ser. No. 11/913,858, filed Nov. 8, 2007, which is the U.S. national stage of International Application PCT/SE2005/000915, filed Jun. 14, 2005.

BACKGROUND AND SUMMARY

The present invention relates to a method for training a person while operating a vehicle.

The invention is applicable to different types of vehicles, in particular air vehicles such as aircraft for training pilots. Although aspects of the invention will be exemplified by describing an aircraft application, the invention can also be applied to other vehicles, such as cars, boats, trains etc. Thus, by the word "vehicles" is meant airborne vehicles, land vehicles as well as marine vehicles.

Training of pilots includes flying with heavily loaded aircraft. A modern aircraft can carry loads weighing at least as much as the weight of the empty aircraft. Therefore, such flights are expensive to perform because the engines have to run at high rating and fuel consumption is high. In addition, the high engine rating means significantly increased engine wear resulting in higher cost for engine maintenance. Furthermore, the stress levels (fatigue) of the aircraft structure are higher in a loaded aircraft resulting in a shorter life span and higher maintenance cost. Training with heavily loaded aircraft also means a flight safety hazard, in particular during the take off phase. A heavy aircraft has less margins and in case of an engine fault, a bird strike or any other incident there will be a higher risk for a catastrophic situation which could result in serious injuries among the crew.

The high cost and risk for training with heavily loaded aircraft often leads to the fact that such training is avoided and thus, the pilots receive less realistic training than desired.

Ground-based flight simulators are sometimes used for the above-mentioned training but in many aspects they cannot provide sufficiently realistic conditions.

Another type of training which provides more realistic situations is the use of airborne simulation systems used in real aircraft during flying. Such simulation systems use software for imposing power output limits on an engine for simulating an engine failure. A method for simulating an engine failure in a multiple-engine aircraft is described in US 2002/0133322. The engine failure is simulated by placing a software output limiter on one or more engines. This could be combined with fictitious gauge readings on the pilot's instrument panel. However, such a method, which only means that there is an option mode conferring an impaired performance of the engine which is usable for simulating a specific engine failure, does not support general training with heavily loaded aircraft of the type discussed above.

It is desirable to provide a method of the kind referred to in the introduction, which method makes it possible to train persons, such as aircraft pilots, to operate a vehicle during trying conditions in a realistic and safe way and at reasonable costs.

By a method according to an aspect of the present invention, a pilot/driver of the vehicle can experience the behaviour of the vehicle in a certain state without actually operating the vehicle in this certain state. Realistic training can be performed to a lower cost while still using a real vehicle. For example, the vehicle can be selected to behave as if the load configuration was different from the actual conditions. In other words; a simulation of a heavily loaded aircraft can be performed by flying an unloaded (light) aircraft. According to an aspect, an unloaded and light aircraft can be caused to behave like it really was loaded and heavy. This in turn can save costs and improve safety.

The method and system according to an aspect of the invention may be used for simulating many different states of the vehicle and/or the environment to provide training situations for a person. The term "a simulated state which is a possible real state of the vehicle and/or the environment" refers to a state which can very well occur during other conditions while using the same vehicle but which state is simulated to avoid operating the vehicle in such a state and still provide the desired training. The term "different states" does not comprise different designs of the vehicle, or other kinds of vehicle, beyond modifications associated to the loading of the vehicle. As an example, the real state of an air vehicle could be an unloaded state and the simulated state of the air vehicle could be a state where the same air vehicle is loaded with weapons, such as missiles or similar. In another example a simulated fuel quantity is different from the actual fuel quantity carried by the vehicle.

Further examples of simulated states are the simulation of a transient disturbance of an air vehicle due to releasing loads although no actual loads are released, and the simulation of special wind and temperature conditions although the actual weather is different. The consequence of the simulated states is that the weight of the simulated vehicle is different from the actual weight of the vehicle, that the centre of gravity of the simulated vehicle is different from the actual centre of gravity of the vehicle and/or that the moment of inertia the simulated vehicle is different from the actual moment of inertia of the vehicle Further consequences may be that the relationship between the angle of attack and sideslip and the drag and lift of the simulated vehicle is different from the actual relationship between said angles and the drag and lift of the vehicle Particularly, the method according to an aspect of the invention may be used for training a pilot/driver by the simulation of a state, which state is created by controlling dynamic properties of the vehicle and/or controlling an engine of the vehicle, such as the position of one or more air vehicle control surfaces and/or the setting of engine thrust and/or thrust vectoring.

According to an aspect of the invention, the motion of the vehicle in the simulated state is calculated in a first step by using a vehicle model and the vehicle operating commands as input, and then the vehicle command signals are calculated in a second step by using the calculated motion of the vehicle in the simulated state as input to the calculation unit. Hereby, the controller for training mode operation can be designed using the controller for normal mode operation and the equations of motion.

The vehicle model, which can handle different load configurations and environmental conditions for instance, can be either in its simplest form a tabulated vehicle description, but preferably a real time dynamic model for the vehicle motion based on the equations of motion.

The calculated vehicle command signals used for controlling the vehicle are ordinary vehicle control signals and any additional vehicle control signals produced by the training system during training mode only. However, in both cases the calculated vehicle command signals are based on the vehicle operating commands and designed to cause the vehicle to respond to the vehicle operating commands in a way that corresponds to the state simulated by the vehicle model instead of the actual state of the vehicle and/or the environment.

A control unit comprised in the simulation system may be achieved based on known electrical and/or mechanical control components and corresponding software. A computer program comprising an instruction set stored in an internal memory of the computer may be used to instruct a processor for accomplishing the steps of the method when the instruction set is executed in the computer. The computer program can be provided at least partly via a network such as the Internet. The control unit may be designed for receiving a computer readable medium having a stored program or data thereon intended to cause the computer to control the steps of the method according to an aspect of the invention.

BRIEF DESCRIPTION OF THE DRAWINGS

With reference to the appended drawings, below follows a more detailed description of preferred embodiments of the invention provided merely as non-limiting examples.

In the drawings.

DETAILED DESCRIPTION

Figure 1:
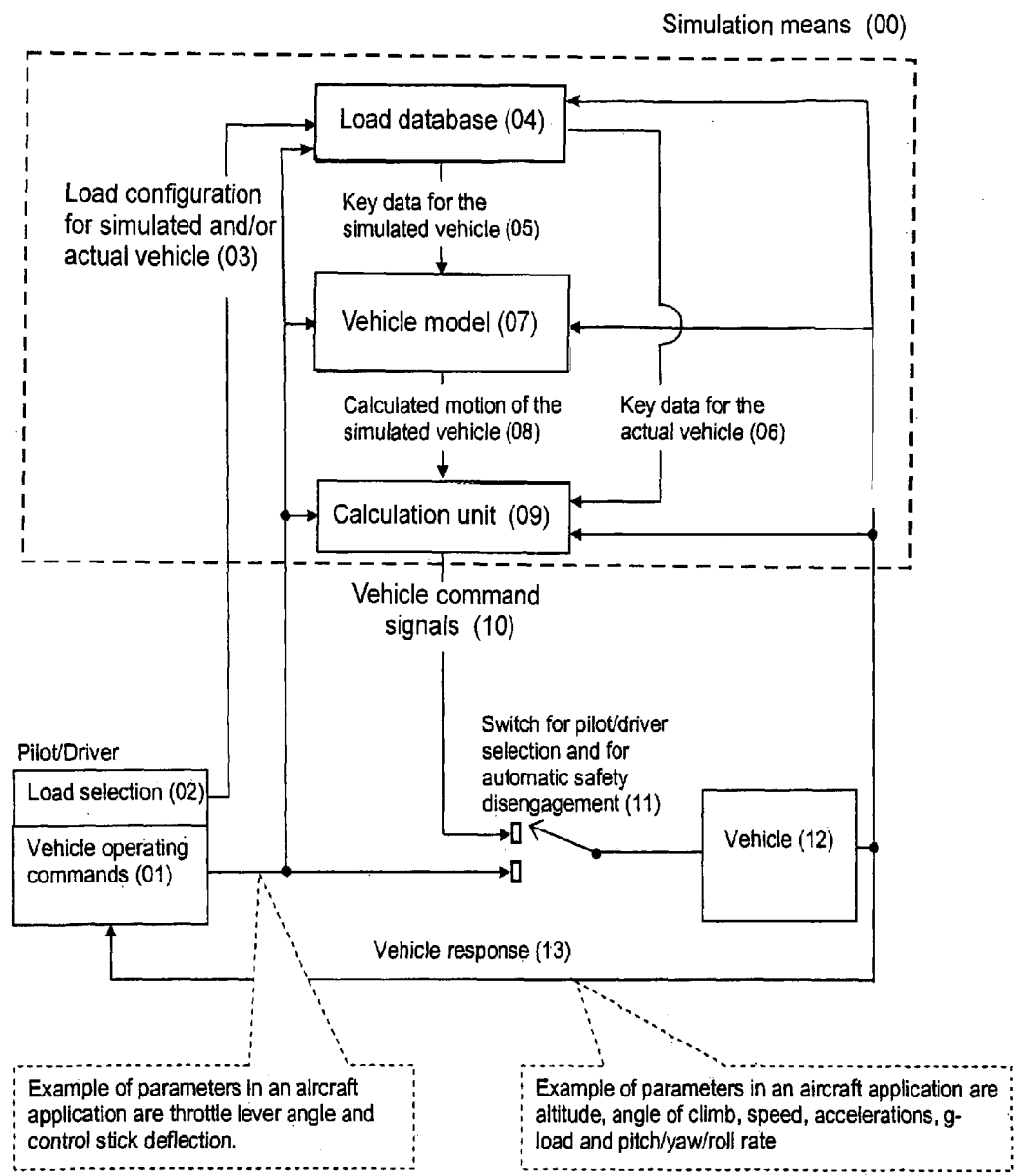
FIG. 1 is a block diagram schematically illustrating one embodiment of a simulation system for carrying out the method according to an aspect of the invention.

A general vehicle simulator system for carrying out the method according to an aspect of the invention is illustrated for a general vehicle in FIG. 1. A pilot/driver normally issues vehicle operating commands 01 for controlling a vehicle 12 and uses the vehicle response 13 as feedback. The vehicle may be provided with a propulsion system comprising one or more engines. In many applications the vehicle is provided with control surfaces. The engines and the control surfaces are to be controlled by the pilot/driver by means of the vehicle operating commands received by a control system of the vehicle.

Examples of vehicle operating command parameters in an aircraft application are power lever angle and control stick deflection. Examples of vehicle response parameters in an aircraft application are altitude, angle of climb, speed, accelerations, g-load and pitch/yaw/roll rates. The system comprises a switch 11 or similar for pilot/driver selection, i.e. for activating the simulation system, or for automatic safety disengagement of the simulation. When the switch is set at the position for training mode operation illustrated in FIG. 1, the system is activated and the pilot/driver can use the method according to an aspect of the invention This means that at least one of the vehicle operating commands 01 is used for creating at least one vehicle command signal 10 to be used by the control system. However, if the switch is moved to another position for normal mode operation, the simulator system is disconnected and the vehicle operating commands are treated by the control system in the ordinary manner.

To create the vehicle command signals 10 a simulation means 00 is used for transformation of the vehicle operating commands 01 into the vehicle command signals 10 The simulation means comprises a calculation unit 09 for calculating vehicle command signals 10. In its simplest form the calculation unit 09 may comprise a means for receiving the vehicle operating commands 01, a pre-calculated table or similar for converting the vehicle operating commands 01 to vehicle command signals 10, and a means for emitting the vehicle command signals 10 to the vehicle 12 The vehicle command signals 10 are then used for controlling the vehicle so as to cause the vehicle 12 to respond to the vehicle operating commands 01 in a way that corresponds to the state simulated by the simulation means 00 instead of the actual state of the vehicle and/or the environment.

In more advanced applications the simulation means 00 may comprise a load database 04, a vehicle model 07 and a more advanced calculation unit 09. The load database 04 contains data for all vehicle loads, the current configuration for the vehicle and how the loads affect the vehicle The vehicle model 07 predicts the motion of the vehicle based on loads and operating commands. The calculation unit 09 converts the calculated motion of the simulated vehicle 08 into vehicle command signals 10 so that the vehicle 12 follows the motion of the simulated vehicle. The calculation unit 09 can be a controller that makes the measured motion of the actual vehicle the same as the simulated vehicle. If measurements of the vehicle motion are not available or if better confidence in measurements is needed, the calculation unit 09 can also use an actual vehicle model to generate the motion of the actual vehicle In another implementation, the calculation unit 09 can comprise an inverse actual vehicle model i.e. a model with the calculated motion of the simulated vehicle 08 as input and the vehicle command signals 10 as output.

A load selection unit 02 may contain data for load configuration 03 for the vehicle to be simulated and for the actual vehicle. The load data base 04 provides key data 05 for the simulated vehicle as input to the vehicle model 07, and provides key data 06 for the actual vehicle as input to the calculation unit 09.

The term "key data" may comprise the mass, position of the centre of gravity and the moments of inertia and the aerodynamic properties of the vehicle. The aerodynamic properties are given by the functions of the vehicle's speed, angle of attack and sideslip and angular velocities yielding the aerodynamic forces and torques.

The vehicle model 07 uses the key data 05 and the vehicle operating commands 01 for calculating the motion of the simulated vehicle 08. In addition, vehicle response 13 can be used in the vehicle model 07. The calculating unit 09 calculates the vehicle command signals 10 by using the calculated motion 08 of the simulated vehicle and the key data 06 for the actual vehicle as input. In addition, the vehicle operating commands 01 and/or the vehicle response 13 can be used as input to the calculation unit 09 air calculation of the vehicle command signals 10.

By using the vehicle command signals 10 to control the vehicle 12, the vehicle responds to the propulsion provided by the propulsion system and/or the settings of the control surfaces to behave like the simulated vehicle 08. The resulting motion of the vehicle 12 is used as feedback to the system and results in the data for the vehicle response 13 changing continuously during the training.

Figure 2:
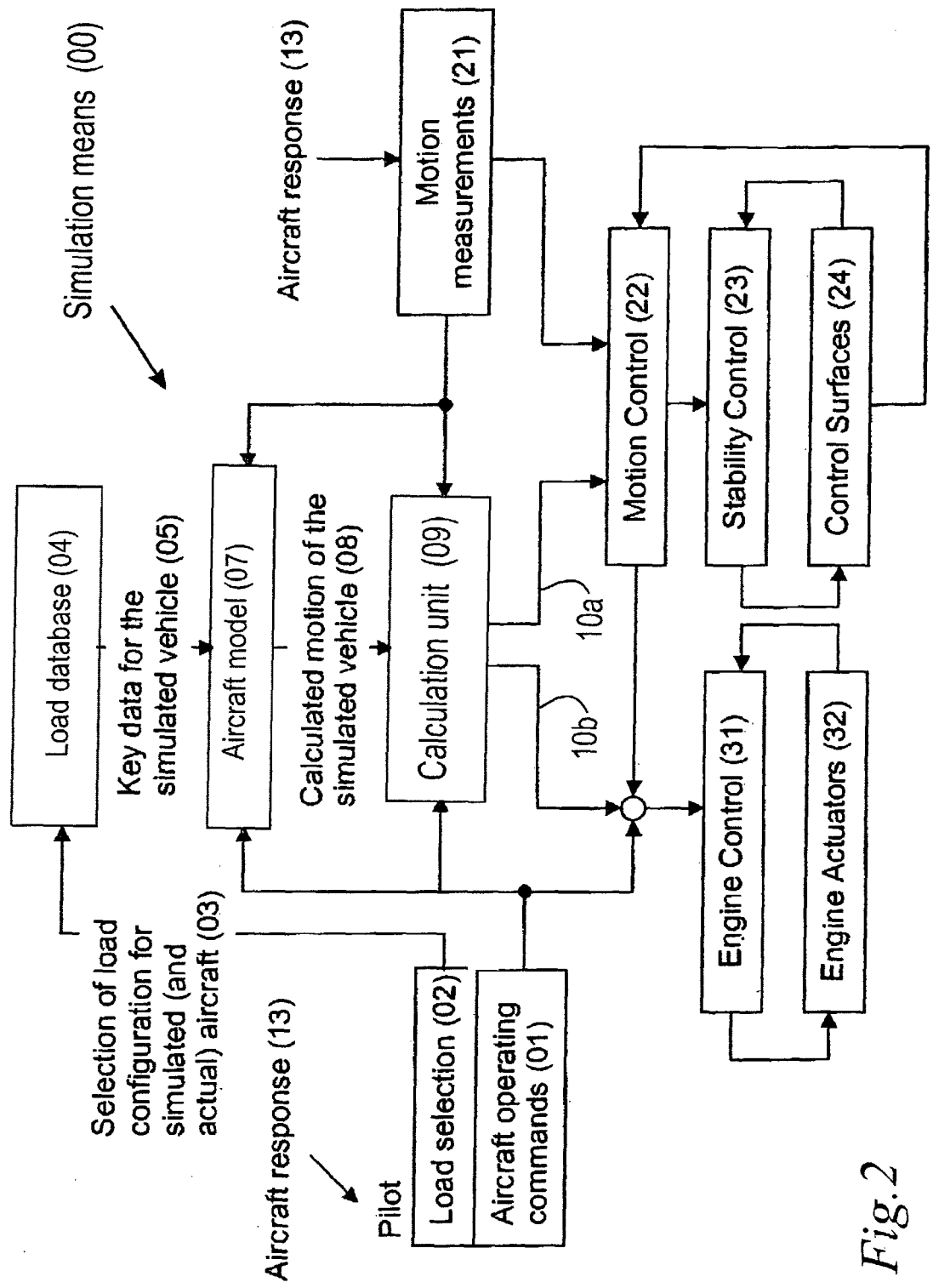
FIG. 2 is a variant of the system in FIG. 1 adapted for an aircraft.

With reference to FIG. 2 an aspect of the invention is exemplified when applied in an aircraft load simulator system for training pilots to perform various kinds of missions and to deal with various kinds of situations by flying the actual aircraft in one configuration, normally being the unloaded basic configuration.

FIG. 2 illustrates an aircraft load simulator system according to an aspect of the invention The functional blocks; a load database 04, an aircraft model 07 for the simulated aircraft and a calculation unit 09 for calculation of vehicle command signals, represent the aircraft load simulator system. The remaining blocks represent the aircraft with associated control functions, pilot commands and inputs.

In this example, it is assumed that the aircraft which is to be equipped with the aircraft load simulator system has a control system comprising a system computer, a fly-by-wire control and an engine control system, such as a full authority digital engine control system. Furthermore, it is assumed that the system computer can provide information and data to the flight and engine control computers and further enables the flight and engine control systems to communicate with each other Although, the simulator system according to an aspect of the invention is preferably partly or totally integrated in the ordinary system computer of the vehicle, the simulator system could be a separate system communicating with the system computer.

Information 03 of the load configuration of the aircraft to be simulated is transferred into the software function load database 04 Loads can be in terms of internal loads, such as passenger weight, cargo weight and distribution, and fuel quantity. Loads can also be in terms of external loads such as number, type and placement of weapons, or in terms of any other internal or external loads such as extra fuel tanks, etc.

Software functions within the load database 04 will calculate the weight, centre of gravity, moments of inertia, aerodynamic properties such as drag and aerodynamic moments and performance limitations such as maximum allowed g-loads (or the g-load envelope if applicable). These calculated data are referred to as key data for the simulated aircraft 05 in FIG. 2.

The actual aircraft system computer is assumed to have the ability to identify the loads for the actual aircraft configuration to be flown during the training mission This function provides the actual aircraft with the same information as the load database does for the simulated aircraft (this information is named key data for the actual vehicle in FIG. 1). In this illustrating example of an aspect of the invention the actual aircraft is unloaded.

When the aircraft load simulator system has been activated for initiating a training flight, key data for the simulated aircraft 05 is calculated by the load database 04 and may be updated with respect to changes in simulated and actual loads. Such changes can be because of fuel consumption and the effect of weapons being fired. Fuel consumption during the flight is in this example calculated within the aircraft model 07.

Key data for the simulated aircraft 05 is, during the training mission, continuously transferred to a software function called aircraft model 07. The key data is used together with aircraft operating commands 01 from the pilot and aircraft motion for calculating the motion of the simulated aircraft 08 in terms of e.g. angle of climb, acceleration and rotation rates (pitch, yaw, roll) by means of the aircraft model 07. The information about the actual aircraft motion is obtained from motion measurements 21 which measure the aircraft response 13.

The motion data for the actual aircraft from the motion measurements 21 is, during the training mission, continuously transferred to a calculation unit or software function called calculation of new commands 09. The data of the motion of the simulated aircraft and data for the actual flight condition are used for calculating the vehicle command signals 10. The vehicle command signals 10 comprise the actual aircraft motion commands 10a, in terms of stick, pedals and other performance-affecting settings such as trim and flaps settings, and/or the actual engine commands 10b in terms of thrust setting. In another embodiment of an aspect of the invention, the engine control 31 and engine actuators 32 loop would be modified, to improve the simulation fidelity. In addition to the vehicle command signals 10, other command signals could also be used. These command signals are not limited to the type of signals which are based on signals issued by the operator, i.e. vehicle operating commands 01. For example, the transient thrust response can be improved for a gas turbine engine if both the exhaust nozzle area and the PLA (Power Lever Angle) are used as inputs to the vehicle 12. This would make it possible to improve the simulation fidelity for some maneuvers such as the simulation of weapons release or quick turns. New command signals require that the engine control 31 and engine actuators 32 loop is modified.

The actual aircraft motion commands are transmitted to the ordinary flight control functions, i.e motion and stability control 22, 23, where they are used for affecting the aircraft control surfaces 24. Correspondingly, the actual engine commands are transmitted to the ordinary engine control 31 where they are used for controlling the engine actuators 32.

The aircraft thus responds to the thrust provided by the engine 31 and the settings of the aircraft control surfaces 24 to behave like the simulated aircraft. The resulting motion of the aircraft is used as feedback to the system and results in the data for the aircraft response 13 being continuously changed during the flight.

To illustrate an aspect of the invention in more detail, a simplified calculation example where an aircraft initially flies at a certain constant speed and altitude, and the pilot then wishes to accelerate as quickly as possible at the same altitude, is described. Furthermore, the pilot is training for a mission that requires a certain load configuration of the aircraft, but for economical or safety reasons or other reasons, the loads are not included during training Thus, the training aircraft has a smaller total weight than the aircraft would have in a corresponding real situation where the loads are carried by the aircraft.

Figure 3:
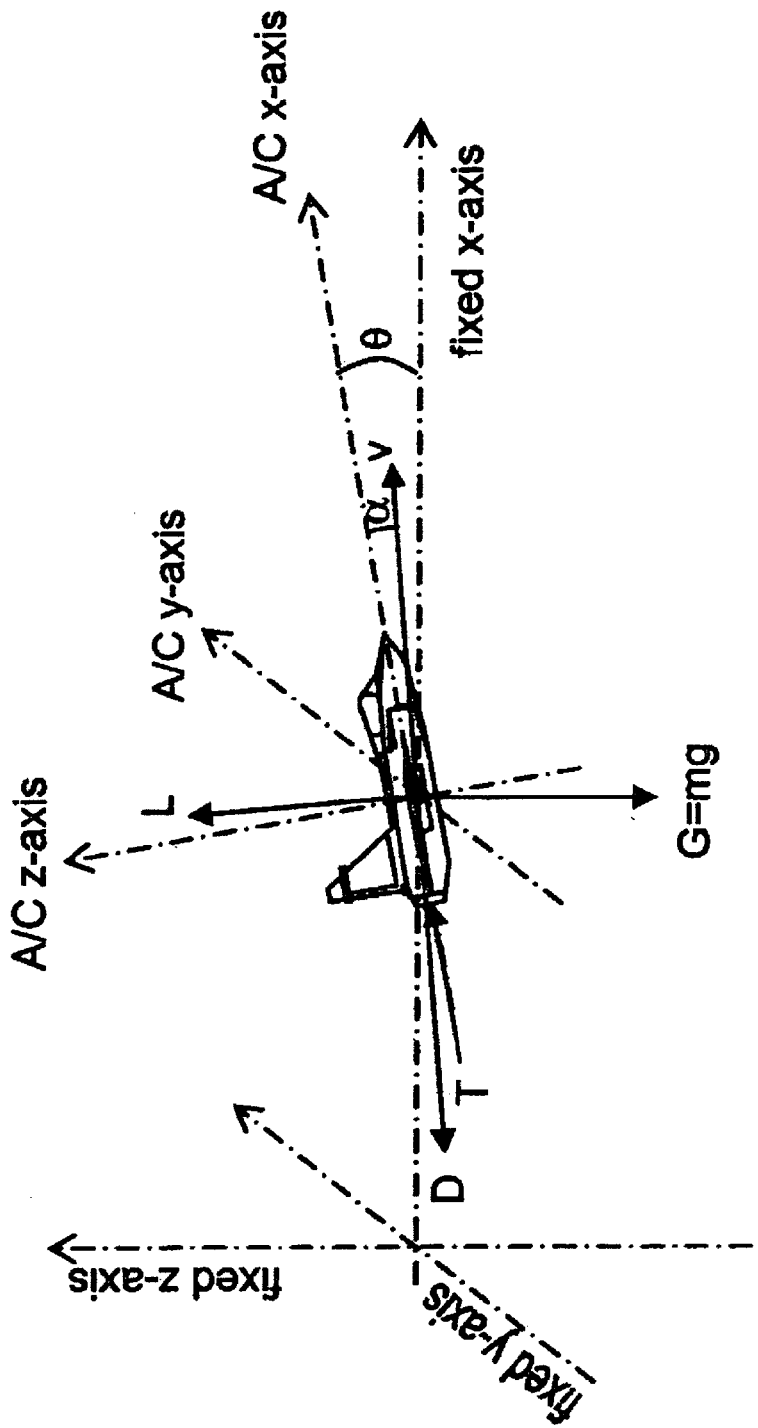
FIG. 3 is a view of an aircraft illustrating the forces acting on an aerial vehicle while flying.

The following definitions of physical conditions related to an aircraft have been used. The motion of an aircraft is described by four basic forces, see FIG. 3 illustrating the forces acting on an aerial vehicle. Theses forces are lift L, thrust T, drag D and gravity G. The drag force is directed backwards and opposite to the velocity vector v of the aircraft. The lift force is directed perpendicular to the drag force and dependent on an attack angle $\alpha$ between an x-axis of the aircraft (A/C x-axis) and the velocity vector v. Gravity G is directed downwards and given by the mass m of the aircraft and the gravity constant g. The pitch attitude $\theta$ is an angle between the aircraft x-axis and a fixed horizontal x-axis.

This particular example is limited to longitudinal control of the aircraft. The primary control surface for movement in the vertical plane is the elevator and the canards are used for stability. The elevator creates a rotational momentum around the y-axis of the aircraft. The velocity of the aircraft is controlled by the engine thrust setting. Thus, in this example the relevant aircraft operating commands are the stick angle affecting the elevator angle and the power lever angle PLA affecting engine thrust T. All forces acting on the aircraft are dependent on parameters such as pressure, temperature, altitude, velocity, angle of attack, aircraft aerodynamics and loads such as remaining amount of fuel, passengers, weapons etc. All these parameters are denoted p in the equations (2) and (3) which equations are described hereinafter.

Figure 4:
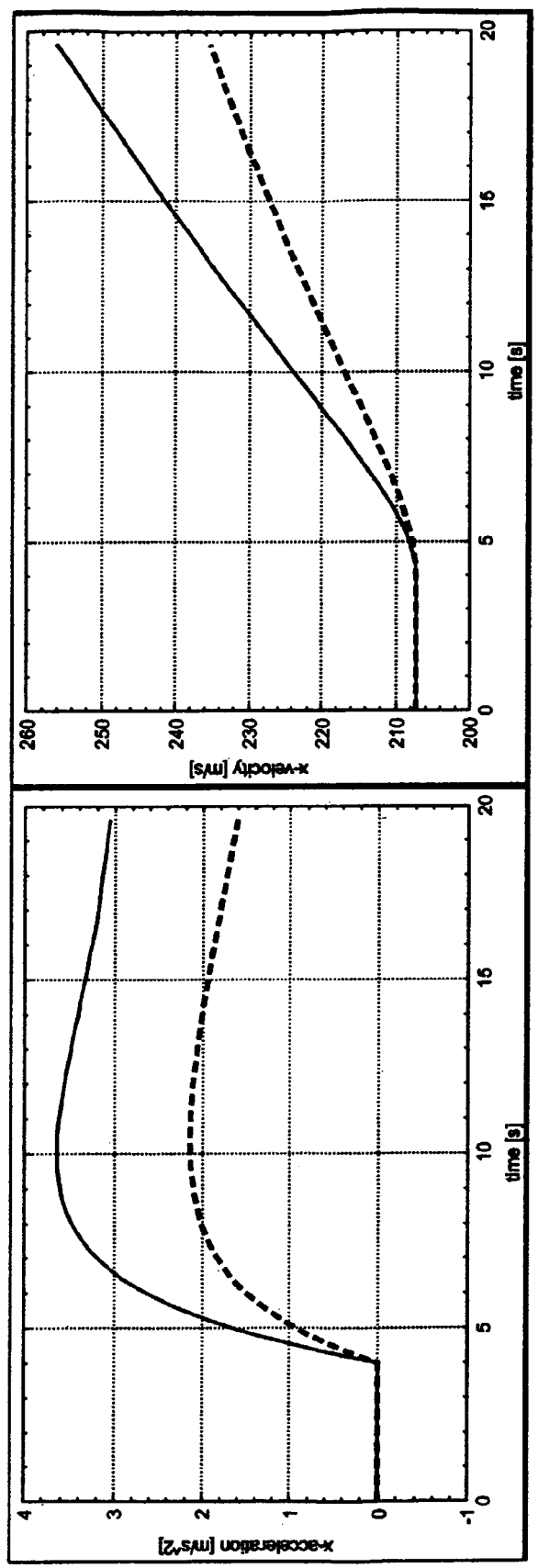
FIG. 4 is a graph illustrating the acceleration and the velocity of a loaded and unloaded aircraft for a certain pilot command.

The aircraft has controls for affecting control functions of the aircraft by means of vehicle operating commands. In this case a control stick can be used for affecting a flight control surface, such as the elevator angle. A power lever can be used for affecting the engine thrust. If the power lever angle PLA is increased, the throttle of the engine is opened and this will result in different accelerations dependent on aircraft loads. In this regard, reference is made to FIG. 4 illustrating the acceleration and increase in velocity of a loaded and unloaded aircraft for a power lever angle step from PLA≈54° to a maximum value of 100° at the time point t=4 s.

The continuous curve represents the unloaded training aircraft without using the simulation method according to an aspect of the invention. The dotted curve represents same training aircraft if loaded. It appears from the curves that the acceleration and increase in velocity of the unloaded aircraft are very high compared to the loaded aircraft, making such pilot training less realistic and not so efficient.

As already mentioned, according to an aspect of the invention a model for simulating a certain state of the aircraft and/or the environment is provided. The simulated state is a possible real state which is different from the actual state of the aircraft and/or environment. In this example, it is desired that the acceleration of the unloaded aircraft during training becomes the same as if the aircraft actually would have been loaded. The aircraft operating commands are received from the controls; in this case the thrust power lever and the elevator angle stick, and the aircraft operating commands and key data for the desired simulated state are used as input to the aircraft model for calculating vehicle command signals.

These vehicle command signals, which are different from the signals which would be expected based on the actual aircraft operating commands if the load simulator system was not in use, are then used for controlling the aircraft so as to cause the aircraft to respond to the aircraft operating commands in a way that corresponds to the state simulated by the aircraft model instead of the actual state of the aircraft.

In this case the vehicle command signals are used for controlling an engine control function, the throttle of the engine, obtaining an engine thrust which is adapted to keep the acceleration (and velocity) the same for the unloaded training aircraft as it would have been for the loaded aircraft for the same instrument setting and pilot commands without calculation of said vehicle command signals.

Assuming that the engine thrust is aligned with the aircraft x-axis, the aircraft motion expressed in fixed x-z coordinates is described below by the following relations:

$$\dot{x} = v\cos(\theta - a), \dot{z} = v\sin(\theta - a) \quad (1)$$

$$\ddot{x} = [T(p)\cos\theta - L(p)\sin(\theta - a) - D(p)\cos(\theta - a)]/m \quad (2)$$

$$\ddot{z} = [T(p)\sin\theta - L(p)\cos(\theta - a) - D(p)\sin(\theta - a) - mg]/m \quad (3)$$

$$PLA = PLA_O + k\left[(\ddot{x}_{sim} - \ddot{x}) + \frac{1}{T_i}\int(\ddot{x}_{sim} - \ddot{x})dt\right] \quad (4)$$

Thus, the exemplified simulation is designed to keep the acceleration (and velocity) the same for the training aircraft as it would be for a loaded aircraft. A matching of the acceleration along the x-axis is performed in equation (4) by the use of for example a Pi-controller. By the Pi-controller the actual engine command PLA is calculated. Tj and k are the controller time constant and gain, respectively. $PLA_O$ denotes the stationary thrust demand for training and will result in the same stationary velocity as for the simulated aircraft with the actual pilot command.

Although it is not explicitly described herein how the aircraft control surfaces, such as the elevator, have been controlled so as to maintain the altitude of the training aircraft, vehicle command signals are also calculated for affecting the aircraft control surfaces as desired. Of course different algorithms are required when simulating different states of the aircraft and/or the environment to the aircraft. In many applications a six dimensional problem has to be addressed, which means that flight maneuvers in the lateral direction would also be included.

Furthermore, changes in important parameters such as the angle of attack, pitch attitude, or moments of inertia have not been explicitly addressed in this description. However, these parameters have been included in the exemplified simulation illustrated in FIG. 5 and are represented by p in equations (2) and (3).

The following sequence describes how the pilot commands may be transformed by means of the system and the method according to an aspect of the invention.

a) The pilot selects the appropriate training mode for the aircraft, b) The moment of inertia around the y-axis of the aircraft, the aircraft mass, and the centre of gravity from the load database are used together with current values and immediate history of the measured inputs to calculate the drag, lift, gravity and momentum for the simulated aircraft through the use of an aircraft model, and c) The motion of the simulated aircraft can then be calculated using the equations (1), (2) and (3). The system controls the aircraft such that the actual aircraft follows the simulated aircraft trajectory. By using the pilot commands and the difference between the simulated aircraft trajectory and the actual flight condition as input, the actual aircraft motion commands and the actual engine commands can be produced as output. These vehicle command signals are then used for controlling the aircraft On the left in FIG. 5, it is shown how the real acceleration of the unloaded aircraft follows the simulated acceleration (see also dashed curve in FIG. 4) expected for the simulated loaded aircraft. The aircraft is tracking the model very well, which means that its performance is very similar to the performance of the simulated loaded aircraft.

Figure 5:
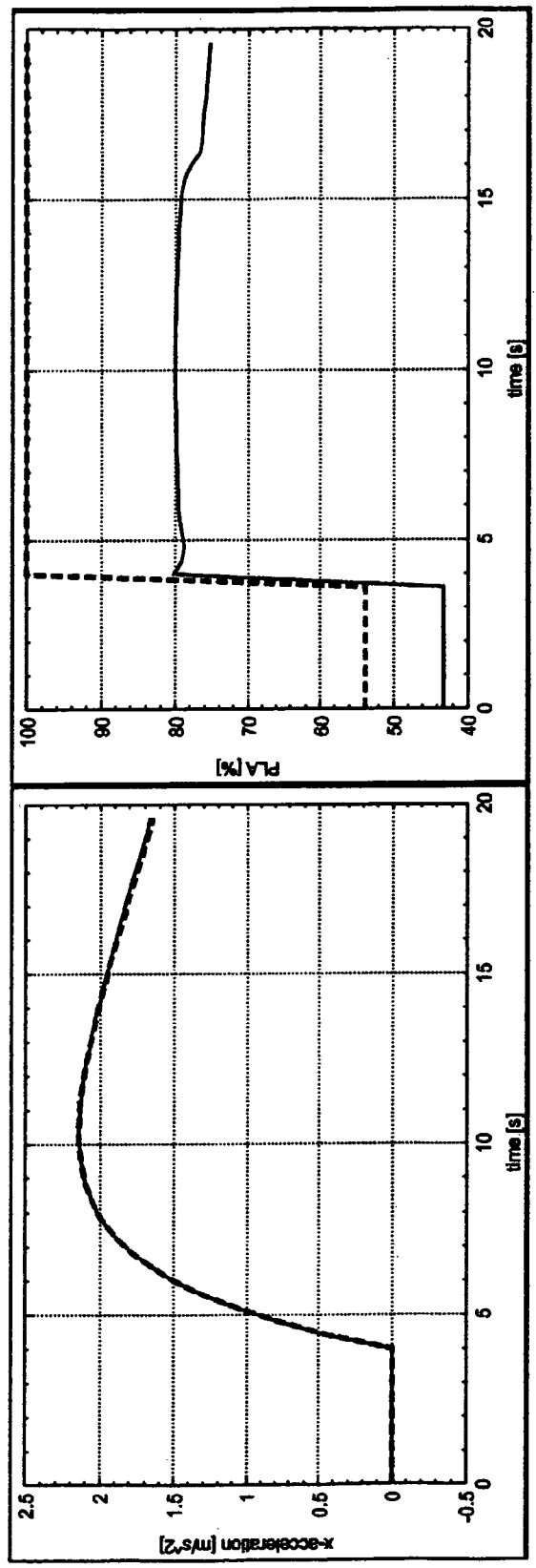
FIG. 5 is a graph illustrating the acceleration of a loaded aircraft as in FIG. 4 and the acceleration of an unloaded aircraft controlled by the system and the method according to an aspect of the invention for simulating a loaded aircraft (to the left), and pilot PLA-command (Power Lever Angle) and calculated actual engine PLA-command (to the right).

In the example, the pilot command is a step from PLA≈54° to the maximum PLA angle of 100°, which is shown by the dashed curve on the right in FIG. 5. The calculated actual engine PLA-command used during the flight, which command corresponds to the pilot command and which actually affects the engine thrust, follows the lower continuous curve and makes the aircraft response similar to the response which is expected by a loaded aircraft. This concludes the simplified example.

It is to be understood that the present invention is not limited to the embodiments described above and illustrated in the drawings; rather, the skilled person will recognize that many changes and modifications may be made within the scope of the appended claims. For example the algorithms of the model used in the method may be varied in many ways.

What is claimed is:

1. A method of simulating an operating state of a vehicle, the method comprising:
   operating the vehicle via a control system, the control system being arranged to receive vehicle operating commands from a person for controlling the vehicle and to create vehicle operating command signals,
   selectively operating the vehicle in a normal state of operation having an actual vehicle load and a simulated state of operation having a simulated vehicle load, a load being one or more measures of weight carried by the vehicle,
   the simulated state of operation calculated by applying, to a vehicle model that predicts the motion of the vehicle based on the vehicle operating commands, data from a load database including (a) data for a plurality of simulated vehicle loads and (b) data for how the simulated loads affect the vehicle,
   the simulated state of operation being different from the normal state of operation,
   wherein in the simulated state of operation the vehicle operating commands are transformed to the vehicle operating command signals to control the vehicle such that motion of the vehicle matches the predicted motion of the vehicle from the vehicle model,
   wherein the load database further comprises data for the vehicle loads and a current configuration of the vehicle, and the predicted motion is based on the data for the vehicle loads and the current configuration of the vehicle, and
   wherein the vehicle is an aircraft, and data about the actual motion of the vehicle is obtained from motion measurements which measure the aircraft response,
   the data for the actual motion of the aircraft from the motion measurements is, during a training mission, continuously transferred to a calculation unit,
   data of the motion of the simulated state of operation and the data for the actual motion of the aircraft are used for calculating the vehicle command signals, and
   the vehicle operating commands include motion commands, used for affecting aircraft control surfaces, that are transmitted in a way that corresponds to the simulated state of operation simulated to ordinary engine control where the actual engine commands are used for controlling engine actuators such that the actual engine commands control the throttle of the engine to obtain an engine thrust to simulate an acceleration of a loaded aircraft for the aircraft when unloaded as it would have been for the aircraft when loaded.

2. The method of claim 1, wherein the simulated vehicle load is selected from one of simulated passengers, simulated fuel, simulated weaponry or simulated cargo.

3. The method of claim 2, wherein the simulated vehicle load is arranged to change over a period of time.

4. The method of claim 1, further comprising transforming the vehicle operating command signals as a function of at least one of key data for the simulated state of the vehicle and key data for the actual vehicle.

5. The method of claim 4, further comprising using the load database to calculate the at least one of key data from the simulated state of the vehicle and key data for an actual state of the vehicle.

6. The method of claim 5, further comprising calculating the key data from the simulated state of the vehicle by using the vehicle operating commands as input to the control system.

7. The method of claim 5, further comprising calculating the key data for the actual state of the vehicle by using a vehicle response.

8. The method of claim 5, further comprising calculating the at least one of the key data for the simulated state of the vehicle and the key data for the actual state of the vehicle by using a load configuration for at least one of the simulated state and an actual vehicle state as input to the load database.

9. The method of claim 1, further comprising calculating, in a first step, motion of the vehicle in the simulated state by using the vehicle model and the vehicle operating commands as input, and then calculating, in a second step, the vehicle operating command signals by using the calculated motion of the vehicle in the simulated state as an input to a calculation unit.

10. The method of claim 4, further comprising transmitting the key data for the simulated state of the vehicle to the vehicle model during operation of the vehicle.

11. The method of claim 9, further comprising calculating the vehicle operating command signals by using the vehicle operating commands as input during the second step.

12. The method of claim 9, further comprising calculating the vehicle operating command signals by using key data for the actual vehicle.

13. The method of claim 1, further comprising transforming the vehicle operating command signals as a function of vehicle response.

14. The method of claim 1, further comprising transforming the vehicle operating command signals as a function of vehicle response.

15. The method of claim 1, further comprising using the vehicle operating command signals in order to simulate transient effects on vehicle motion relating to load release.

16. The method of claim 1, further comprising using pre-calculated data for transforming the vehicle operating command signals, the pre-calculated data defining a relation between certain vehicle operating commands and the vehicle operating command signals.

17. The method of claim 1, further comprising using the transformed vehicle operating command signals for controlling at least one actuator of the vehicle.

18. The method of claim 17, further comprising using the transformed vehicle operating command signals for controlling at least one actuator of an engine of the vehicle.

19. The method of claim 18, further comprising using the transformed vehicle operating command signals for controlling power or thrust of the engine.

20. The method of claim 17, further comprising using the transformed vehicle operating command signals for controlling at least one control surface of the vehicle.

21. The method of claim 20, further comprising using the transformed vehicle operating command signals for controlling a position of the control surface.

22. The method of claim 17, further comprising using the transformed vehicle operating command signals for controlling at least one wheel of the vehicle.

23. The method of claim 22, further comprising using the transformed vehicle operating command signals for controlling at least one wheel brake actuator of the vehicle.

24. The method of claim 1, wherein a weight of the simulated state of the vehicle is different from a real weight of the vehicle.

25. The method of claim 1, further comprising switching between a training mode operation in which behavior of the vehicle in the simulated state of the vehicle is arranged to be obtained and a normal mode operation during the same operation of the vehicle.

26. The method of claim 1, further comprising switching between the simulated state of the vehicle and a different simulated state of the vehicle during a same flight of the vehicle, the vehicle being an air vehicle.

27. The method of claim 1, further comprising the vehicle is an air vehicle and training a person while operating the air vehicle which is adapted to be flown in either one of a first configuration or in a second configuration, the first and second configurations being selectable by the operator during a flight, and using the simulated state for simulating a transition from the first configuration to the second configuration.

28. The method of claim 1, further comprising the vehicle is an air vehicle and training the person while operating the air vehicle.

29. The method of claim 1, wherein the vehicle operating command signals are used for controlling at least one of a propulsion system and one or more control surfaces of the vehicle while it is operated in the simulated state such that motion of the vehicle matches the predicted motion of the vehicle from the vehicle model.

30. A training system for training a person to operate a vehicle under a simulated operating state of a vehicle, the training system comprising:
  a control system for operating the vehicle, the control system being arranged to receive vehicle operating commands from a person for controlling the vehicle and to create vehicle operating command signals,
  means for selectively operating the vehicle in a normal state of operation of an actual vehicle having an actual vehicle load and operating the vehicle in a simulated state of operation having a simulated vehicle load, the simulated state of operation being different from the normal state of operation of an actual vehicle, a load being one or more measures of weight carried by the vehicle,
    wherein in a simulated state of operation the vehicle operating commands are transformed to the vehicle operating command signals based on a load database by applying, to a vehicle model that predicts the motion of the vehicle based on the vehicle operating commands, data from the load database including (a) data for a plurality of simulated vehicle loads and (b) data for how the simulated loads affect the vehicle,
  wherein the load database further comprises data for the vehicle loads and a current configuration of the vehicle, and the predicted motion is based on the data for the vehicle loads and the current configuration of the vehicle, and
  wherein the vehicle is an aircraft, and data about the actual motion of the vehicle is obtained from motion measurements which measure the aircraft response,
  the data for the actual motion of the aircraft from the motion measurements is, during a training mission, continuously transferred to a calculation unit,
  data of the motion of the simulated state of operation and the data for the actual motion of the aircraft are used for calculating the vehicle command signals, and
  the vehicle operating commands include motion commands, used for affecting aircraft control surfaces, that are transmitted in a way that corresponds to the simulated state of operation simulated to ordinary engine control where the actual engine commands are used for controlling engine actuators such that the actual engine commands control the throttle of the engine to obtain an engine thrust to simulate an acceleration of a loaded aircraft for the aircraft when unloaded as it would have been for the aircraft when loaded.

31. The training system as claimed in claim 30, wherein the simulated vehicle load is selected from one of simulated passengers, simulated fuel, simulated weaponry or simulated cargo.

32. The training system as claimed in claim 31, wherein the simulated vehicle load is arranged to change over a period of time.

33. The training system according to claim 30, wherein the means for selectively operating the vehicle in the simulated state of operation transmits the transformed vehicle operating command signals to at least one controllable component of the vehicle for controlling at least one of a propulsion system and one or more control surfaces of the vehicle such that motion of the vehicle matches the predicted motion of the vehicle from the vehicle model.

* * * * *